(12) United States Patent
Bhagwat et al.

(10) Patent No.: US 9,774,667 B2
(45) Date of Patent: Sep. 26, 2017

(54) SYSTEM AND METHOD FOR DYNAMICALLY CONFIGURING A LOAD BALANCER IN A VIRTUAL NETWORK ENVIRONMENT

(71) Applicant: VMWARE, INC., Palo Alto, CA (US)

(72) Inventors: Abhinav Vijay Bhagwat, Pune (IN); Aravind Srinivasan, Pune (IN); Amit Ratnapal Sangodkar, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/074,791

(22) Filed: Nov. 8, 2013

(65) Prior Publication Data
US 2015/0134822 A1    May 14, 2015

(51) Int. Cl.
G06F 15/173    (2006.01)
H04L 29/08    (2006.01)
H04L 12/911    (2013.01)
H04L 12/24    (2006.01)

(52) U.S. Cl.
CPC ...... H04L 67/1025 (2013.01); H04L 41/0803 (2013.01); H04L 47/70 (2013.01)

(58) Field of Classification Search
CPC ................................................. H04L 47/70
See application file for complete search history.

(56) References Cited

U.S. PATENT DOCUMENTS

| | | | |
|---|---|---|---|
| 8,549,187 B1 | 10/2013 | Christopher et al. | |
| 8,909,780 B1 * | 12/2014 | Dickinson et al. | 709/225 |
| 9,047,109 B1 | 6/2015 | Wang et al. | |
| 2002/0010799 A1 | 1/2002 | Kubota et al. | |
| 2007/0094411 A1 * | 4/2007 | Mullane | H04L 29/12066 709/245 |
| 2008/0250407 A1 * | 10/2008 | Dadhia | G06F 9/45533 718/1 |
| 2009/0300178 A1 * | 12/2009 | Saunderson | H04L 12/4641 709/224 |
| 2010/0302974 A1 * | 12/2010 | Niiyama | G07C 5/085 370/254 |
| 2010/0322087 A1 | 12/2010 | Draznin | |
| 2012/0117241 A1 * | 5/2012 | Witt et al. | 709/226 |
| 2012/0173742 A1 * | 7/2012 | Noldus | H04L 29/12132 709/228 |
| 2012/0297037 A1 * | 11/2012 | Kumagai | H04L 12/4641 709/222 |
| 2013/0019277 A1 | 1/2013 | Chang et al. | |
| 2013/0132545 A1 * | 5/2013 | Schultze | H04L 41/00 709/223 |
| 2013/0311991 A1 * | 11/2013 | Li | H04L 61/103 718/1 |

(Continued)

*Primary Examiner* — Richard G Keehn

(57) ABSTRACT

Techniques for dynamic configuration of a load balancer in a virtual network environment are described. In one example embodiment, load balancing rules are configured using virtual machine (VM) inventory objects. The configured load balancing rules are then transformed by replacing the VM inventory objects in the configured load balancing rules with associated Internet protocol (IP) addresses using an IP address management (IPAM) table or a network address translation (NAT) table. The transformed load balancing rules are then sent to the load balancer for load balancing network traffic between a plurality of VMs running on one or more host computing systems in one or more computing networks.

15 Claims, 5 Drawing Sheets

(56) References Cited

U.S. PATENT DOCUMENTS

| | | | |
|---|---|---|---|
| 2014/0130044 A1* | 5/2014 | Zhang | G06F 9/45533 718/1 |
| 2015/0052522 A1* | 2/2015 | Chanda | G06F 9/455 718/1 |
| 2015/0120911 A1* | 4/2015 | Devnath et al. | 709/224 |

* cited by examiner

SYSTEM AND METHOD FOR DYNAMICALLY CONFIGURING A LOAD BALANCER IN A VIRTUAL NETWORK ENVIRONMENT

TECHNICAL FIELD

The present disclosure relates generally to a load balancer in a virtual network environment and, more particularly, to dynamically configuring the load balancer based on any updates made to network services in the virtual network environment.

BACKGROUND

In computer networking, load balancing is a technique to distribute network traffic across two or more computing resources, such as host computing systems, network links, central processing units (CPUs), hard drives, or other resources to maximize throughput, minimize response time, and/or avoid overload. Typically, a load balancer is located in a data path to distribute the network traffic across the computing resources in one or more networks. Information is ordinarily transmitted within the networks in packets and the term packet refers to a unit of data communicated within a network. A packet typically includes a packet source identifier and as packet destination identifier used to navigate the packet data through a network. The term packet may refer to a unit of data through a network. The term packet may refer to a unit of data communicated at any level of an open systems interconnection (OSI) model and between levels of the OSI model.

In order to perform load balancing, the load balancer inspects packets at an interface between the networks and makes forwarding decisions based on load balancing rules. A security administrator ordinarily configures the load balancing rules using source and destination addresses within a file. The load balancing rule instructs the load balancer to which computing resource the packet needs to be forwarded. The load balancer may also work at an application layer of the OSI model by inspecting/modifying a stream of packets and then forward the new/modified/inspected stream of packets to the computing resources.

One challenge with defining the load balancing rules in terms of the source and destination addresses is the need for the administrator to continually update the load balancing rules to keep abreast of changes in the network. Machines may be added or removed from the network and machines' Internet protocol (IP) addresses can change from time to time, requiring corresponding changes to the load balancing rules.

Further, in complex networks in which the changes are many and frequent, the need to update the load balancing rules to keep pace with changes to network configuration, such as user configured load balancing rules, network interface card (NIC) assigned Internet protocol (IP) addresses in an IP address management (IPAM) table, network address translation (NAT) addresses in a NAT table, virtual machine (VM) inventory objects and the like can pose a significant challenge. This can be even more a challenge in a virtual network environment where VMs can be dynamically added and/or removed in which case the load balancer may need to be manually reconfigured.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a hunting sense, and the scope of the present invention is defined by the appended claims.

Embodiments described herein provide enhanced computer-based and network-based methods, techniques, and systems for dynamic configuration of a load balancer in a virtual network environment. A load balancing manager residing in a management plane maps load balancing rules including virtual machine (VM) inventory objects to associated Internet Protocol (IP) addresses and dynamically configures the load balancer located in a data plane based on the mapping information. Basically, the technique involves formulating the load balancing rules using VM identifiers and machine attributes, such as network address translation (NAT) assigned IP addresses from a NAT table and network interface card (NIC) assigned IP addresses from an IP address management (IPAM) table. One skilled in the art can envision that IP addresses of the VMs can also be obtained using methods, such as a domain name service (DNS), or a dynamic host configuration protocol (DHCP). Using this technique allows the load balancer to be dynamically updated anytime VMs are changed or reconfigured.

Further, utility value of configuring the load balancing rules using the VM inventory objects to an administrator is enhanced by significantly reducing the need for the administrator to manually revisit the load balancing rules and make corresponding changes to the load balancing rules whenever a new VM is added to the system, a existing VM is removed from the system or every time the IP address changes. Furthermore, by using the VM inventory objects, the load balancing manager updates the load balancing rules dynamically anytime there are any changes in the IP addresses.

System Overview and Examples of Operation

Figure 1:
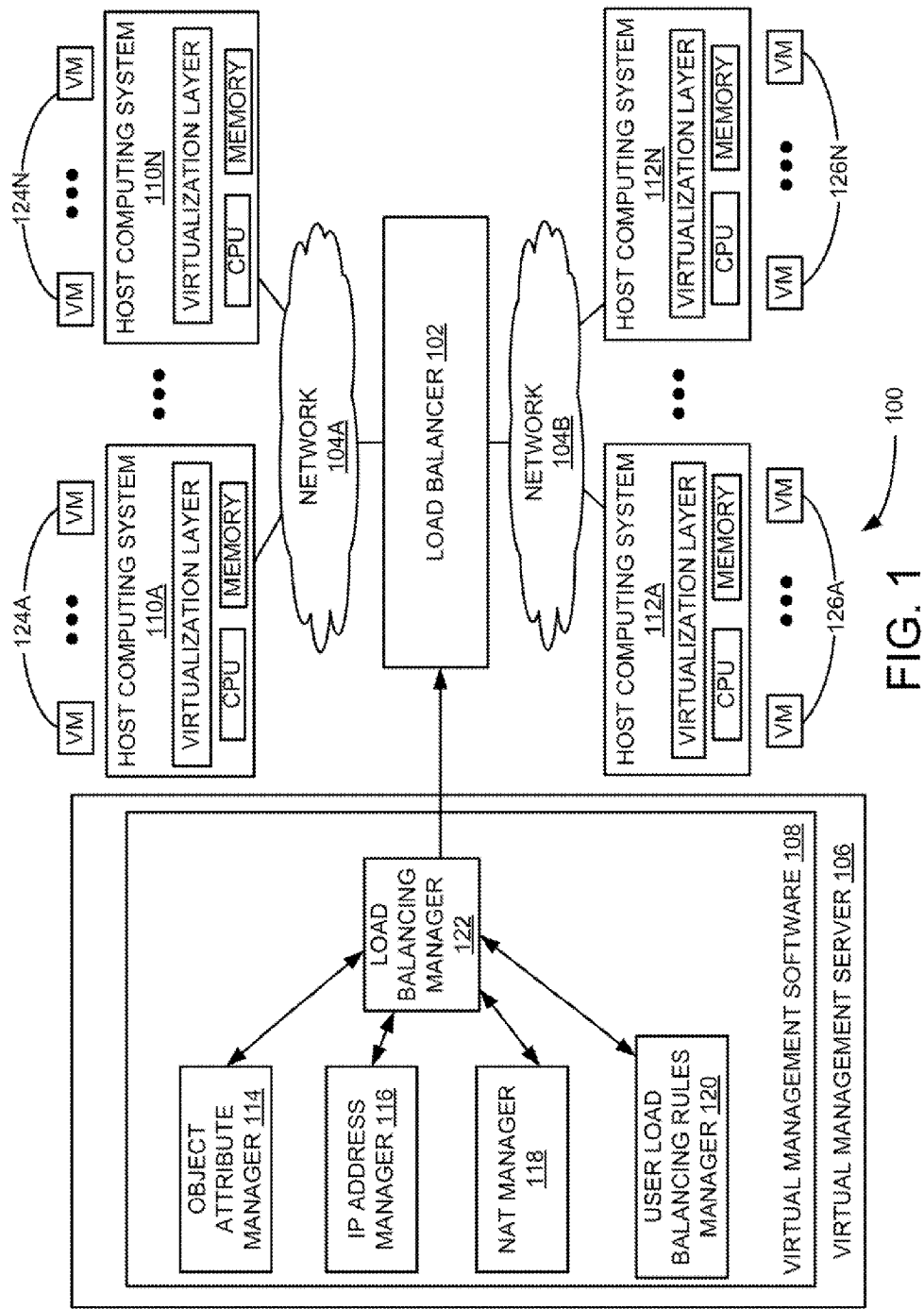
FIG. 1 is a block diagram that illustrates using dynamically collaborated and managed network services for dynamic configuration of a load balancer in a virtual network environment, according to an example embodiment.

FIG. 1 is a block diagram that illustrates using dynamically collaborated and managed network services for dynamic configuration of a load balancer in virtual network environment 100, according to an example embodiment. In the example shown in FIG. 1, virtual network environment 100 includes plurality of host computing systems 110A-N and plurality of VMs 124A-N, respectively, hosted by host computing systems 110A-N. Further, virtual network environment 100 includes plurality of host computing systems 112A-N and plurality of VMs 126A-N, respectively, hosted by host computing systems 112A-N. Also as shown in FIG. 1, virtual network environment 100 includes computing networks 104A and 1048 and load balancer 102. Further as shown in FIG. 1, host computing systems 110A-N are communicatively coupled to load balancer 102 via computing network 104A. Similarly as shown in FIG. 1, host computing systems 112A-N are communicatively coupled to load balancer 102 via computing network 104B.

Also as shown in FIG. 1, virtual network environment 100 includes virtual management server 106. Further as shown in FIG. 1, virtual management server 106 includes virtual management software 108 to provide any needed automated operations management and proactive performance management and to gain visibility across the physical and virtual infrastructures. Furthermore as shown in FIG. 1, virtual management software 108 includes object attribute manager 114, IP address manager 116, NAT manager 118, user load balancing rules manager 120 and load balancing manager 122. In addition as shown in FIG. 1, load balancing manager 122 is communicatively coupled to load balancer 102. One skilled in the art can envision that virtual management software 108 can include one or more load balancing managers, one for each of host computing systems on a computing network, that are communicatively coupled to load balancer 102.

In operation, load balancing manager 122 configures load balancing rules using VM inventory invention objects from VM object attribute table 206 (shown in FIG. 2A) via object attribute manager 114. In one example, the VM inventory objects are a collection of virtual objects and the virtual objects include VMs, vNICs and the like. In one example, load balancing manager 122 configures the load balancing rules using VMs, vNICs, and/or groups of VMs from VM object attribute table 206 via object attribute manager 114. In this example, the groups of VMs are formed by grouping two or more of the VMs based on common attributes, such as a group name, a network name/identifier, a datacenter name, an operating system, inventory folders, resource pools, VM tags and so on.

Load balancing manager 122 then transforms the load balancing rules by replacing the VM inventory objects in the configured load balancing rules with associated IP addresses using IPAM table 208 (shown in FIG. 2A) via IP address manager 116 or NAT table 210 (shown in FIG. 2A) via NAT manager 118. In some embodiments, if the configured load balancing rules are specified using NIC assigned IP addresses, then load balancing manager 122 replaces any of the VM inventory objects specified in the source and/or destination of the configured load balancing rules with the assigned IP address of the VM inventory object using IPAM table 208. Further, in these embodiments, if the configured load balancing rules are specified using NAT assigned IP addresses, then load balancing manager 122 replaces any of the remaining VM inventory objects specified in the source and/or destination of the configured load balancing rules with the NAT IP address of the VM inventory objects by using NAT table 210.

Figure 2A:
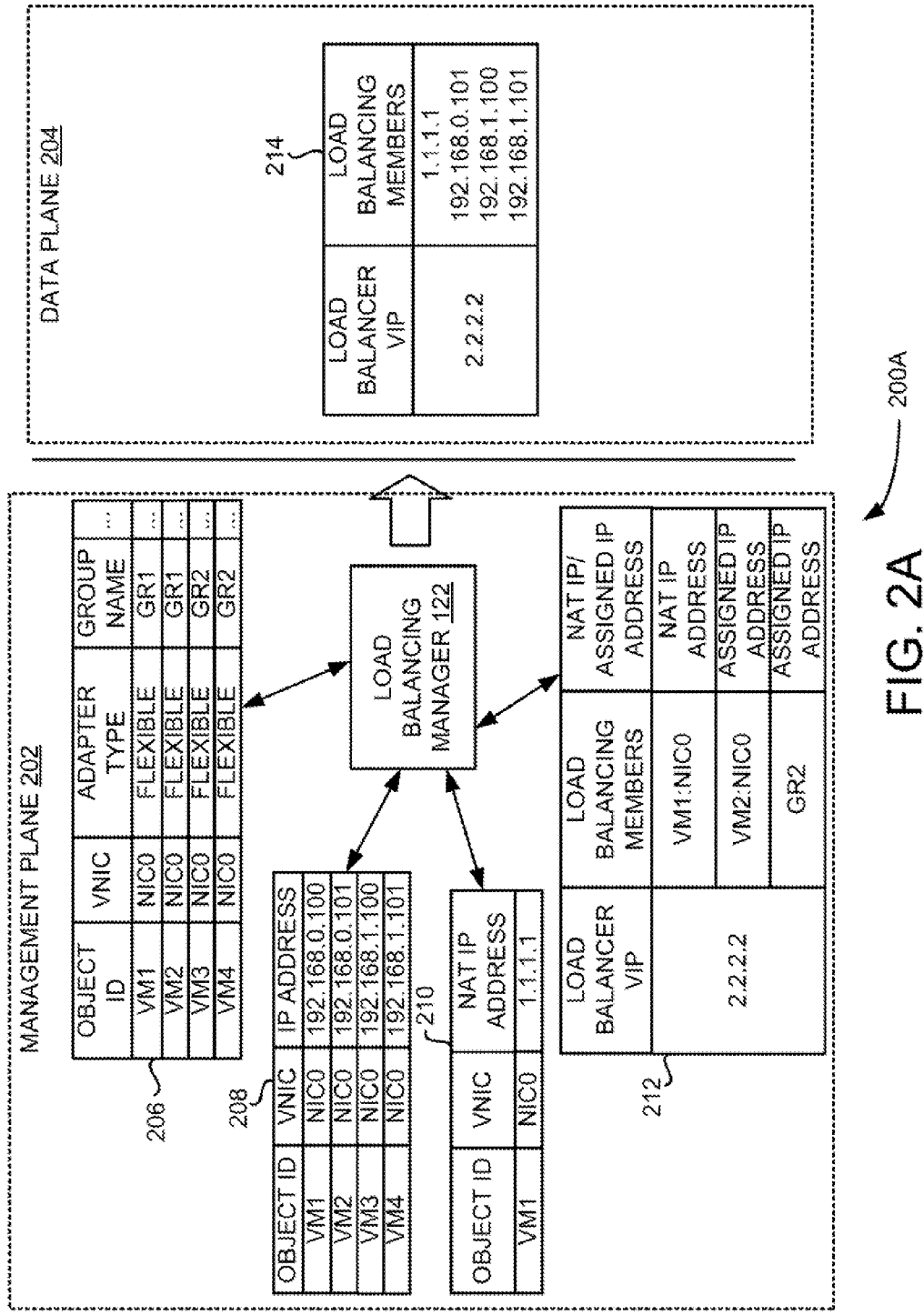
FIG. 2A is a block diagram of a communication system that includes multiple components associated with the dynamically collaborated and managed network services and a dynamically configurable load balancer to impose load balancing rules based on interaction with different components of the communication system, according to an example embodiment.
Figure 2B:
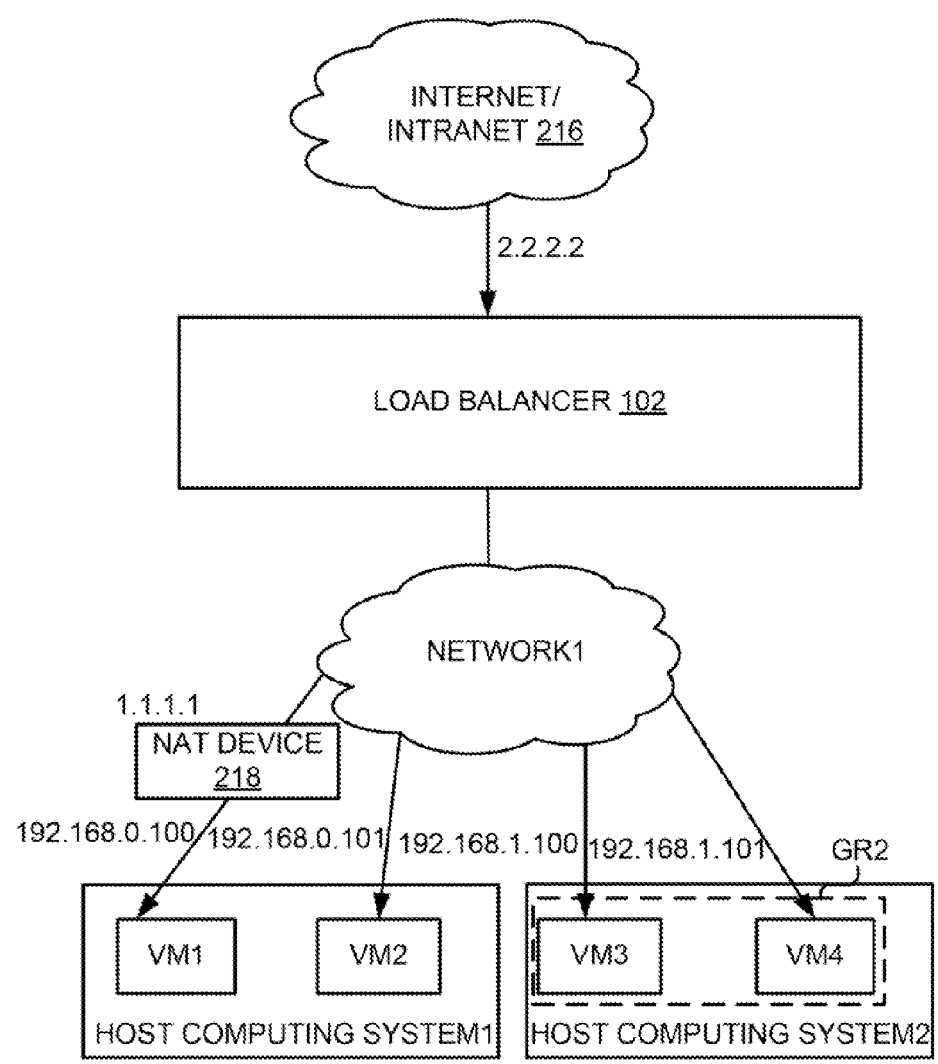
FIG. 2B is a block diagram illustrating the dynamically configurable load balancer distributing network traffic across a plurality of virtual machines (VMs) using the load balancing rules, such as shown in FIG. 2A, according to an example embodiment.

Load balancing manager 122 then sends transformed load balancing rules in table 214 to load balancer 102 for load balancing network traffic between VMs 124A-N and/or VMs 126A-N running on host computing systems 110A-N and host computing systems 112A-N, respectively. In these embodiments, load balancing manager 122 is configured for load balancing network traffic between VMs residing on the same or different host computing systems. For example, load balancer's virtual IP (VIP) in the transformed load balancing rules can be configured by IP address manager 116 or may be statically assigned. Load balancer 102 distributing network traffic across a plurality of VMs using the received load balancing rules, such as shown in FIG. 2A, is shown in FIG. 2B. For example, VM1, VM2, VM3, VM4, shown in FIG. 2A and FIG. 2B, are any of VMs 124A-N and VMs 126A-N, host computing system1 and host computing system2, shown in FIG. 2B, are any of host computing systems 110A-N and 112A-N and network1, shown in FIG. 2B, is computing network 104A or computing network 104B.

Load balancing manager 122 then determines whether there are any updates made to the configured load balancing rules in table 212, IPAM table 208, NAT table 210 and/or the VM inventory objects in VM object attribute table 206. Example updates include addition/deletion of a VM, addition/deletion of a vNIC to a VM, addition/deletion of a VM from a group of VMs, change in a network property of the vNIC, change in a VM's NAT IP address, change of a VM's assigned IP address, addition/change of attributes of a VM and/or change in configured load balancing rules, such as add/delete of a load balancing rule or update of a load balancing ride in which a source/destination VM inventory object referenced changes.

In these embodiments, load balancing manager 122 can determine the updates for other tables or the other sub components. Further, VMs 124A-N and VMs 126A-N or host computing systems 110A-N and host computing systems 112A-N running VMs 121A-N and VMs 126A-N, respectively, may proactively send an update to load balancing manager 122 when there is an change in their respective configurations. If there are any updates made to the configured load balancing rules, IPAM table 208, NAT table 210 and/or the VM inventory objects, load balancing manager 122 dynamically updates the transformed load balancing rules sent to load balancer 102 by repeating the steps of configuring, transforming and sending to load balancer 102. If there are no updates to the configured load balancing rules, IPAM table 208, NAT table 210 and/or the VM inventory objects, load balancing manager 122 continues the step of determining whether there are any updates made to the configured load balancing rules, IPAM table 208, NAT table 210 and/or the VM inventory objects. In these embodiments, object attribute manager 114, IP address manager 116, NAT manager 118, and user load balancing rules manager 120 dynamically maintain updates to VM object attribute table 206, IPAM table 208, NAT table 210 and the configured load balancing rules in table 212 (shown in FIG. 2A), respectively.

Similarly, load balancer 102 can be dynamically configured using Physical objects, such as host computing systems, load balancers or physical machines for load balancing network traffic between host computing systems, a hierarchy load balancers or physical machines, respectively, in a physical network environment.

Also, although certain terms are used primarily herein, other terms could be used interchangeably to yield equivalent embodiments and examples. For example, the term "changes" may be used interchangeably with "updates", "revisions" or the like. Further for example, it is well-known that equivalent terms in the field of system virtualization or similar or related fields could be substituted for such terms as "physical computer," "hypervisor," "virtual machine," or the like. The term IPAM refers to planning, tracking, and managing the Internet Protocol address space used in a network. Also the term, NAT refers to the process of modifying IP address information in IPv4/IPv6 headers while in transit across a traffic routing device, i.e., providing a one-to-one translation of IP addresses.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

EXAMPLE PROCESSES

Figure 3:
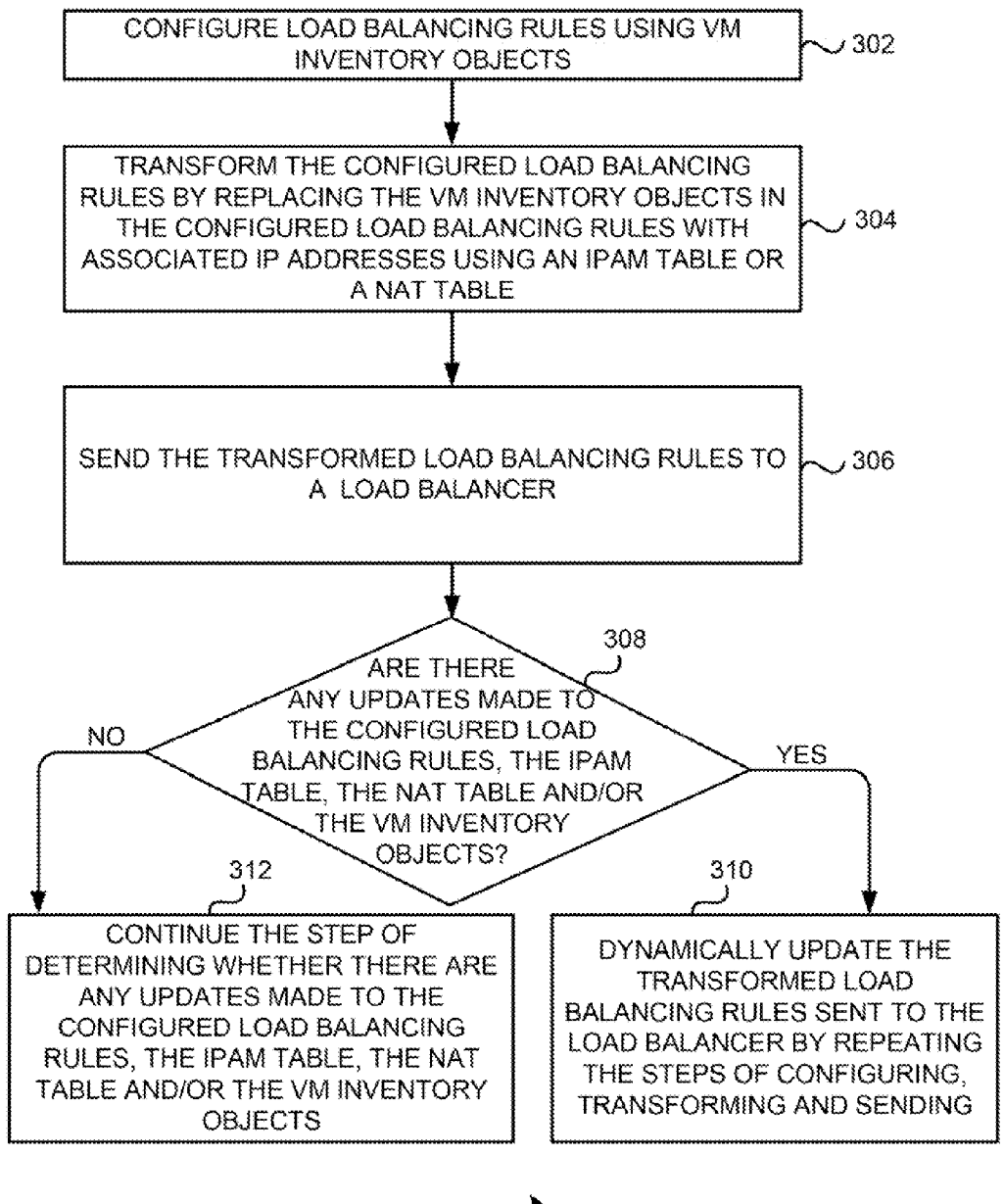
FIG. 3 is a flow diagram of a process for dynamically configuring a load balancer in a virtual network environment, according to an example embodiment.

FIG. 3 is a flow diagram 300 of a process for dynamically configuring a load balancer in a virtual network environment, according to an example embodiment. At block 302, load balancing rules are configured using VM inventory objects. For example, the VM inventory objects include virtual objects, such as VMs and/or vNICs.

At block 304, the configured load balancing rules are transformed by replacing the VM inventory objects in the configured load balancing rules with associated IP addresses using an IPAM table or a NAT table. In one embodiment, any of the VM inventory objects specified in a source and/or a destination of the configured load balancing rules are replaced with assigned IP addresses of the VM inventory objects using the IPAM table, if the configured load balancing rules specify using NIC assigned IP addresses. Further in this embodiment, any of remaining VM inventory objects specified in the source and/or the destination of the configured load balancing rules are replaced with NAT IP addresses of the VM inventory objects using the NAT table, if the configured load balancing rules specify using NAT assigned IP addresses. At block 306, the transformed load balancing rules are sent to the load balancer for load balancing network traffic between VMs running on one or more host computing systems in one or more computing networks.

At block 308, it is determined whether there are any updates made to the configured load balancing rules, the IPAM table, the NAT table and/or the VM inventory objects. For example, the update includes addition of a VM, deletion of a VM, change in a network property of a vNIC, addition/deletion of to vNIC to a VM, change of VM's assigned IP address, change of VM's NAT IP address, addition/change of attributes of a VM and/or change in configured load balancing rides. In this example, the change in configured load balancing rules is addition of a load balancing rule, deletion of a load balancing rule or update of a load balancing rule in which a source/destination inventory object referenced changes.

At block 310, the transformed load balancing rules sent to the load balancer are dynamically updated by repeating the steps of configuring, transforming and sending, if there are any updates made to the configured load balancing rules, the IPAM table, the NAT table and/or the VM inventory objects. At block 312, the step of determining whether there are any updates made to the configured load balancing rules, the IPAM table, the NAT table and/or the VM inventory objects is continued, if there are no updates made to the configured load balancing rules, the IPAM table, the NAT table and/or the VM inventory objects. Further in these embodiments, updates to the VM inventory objects, the IPAM table, the NAT table and/or the configured load balancing rules are dynamically maintained.

EXAMPLE COMPUTING SYSTEM IMPLEMENTATION

Figure 4:
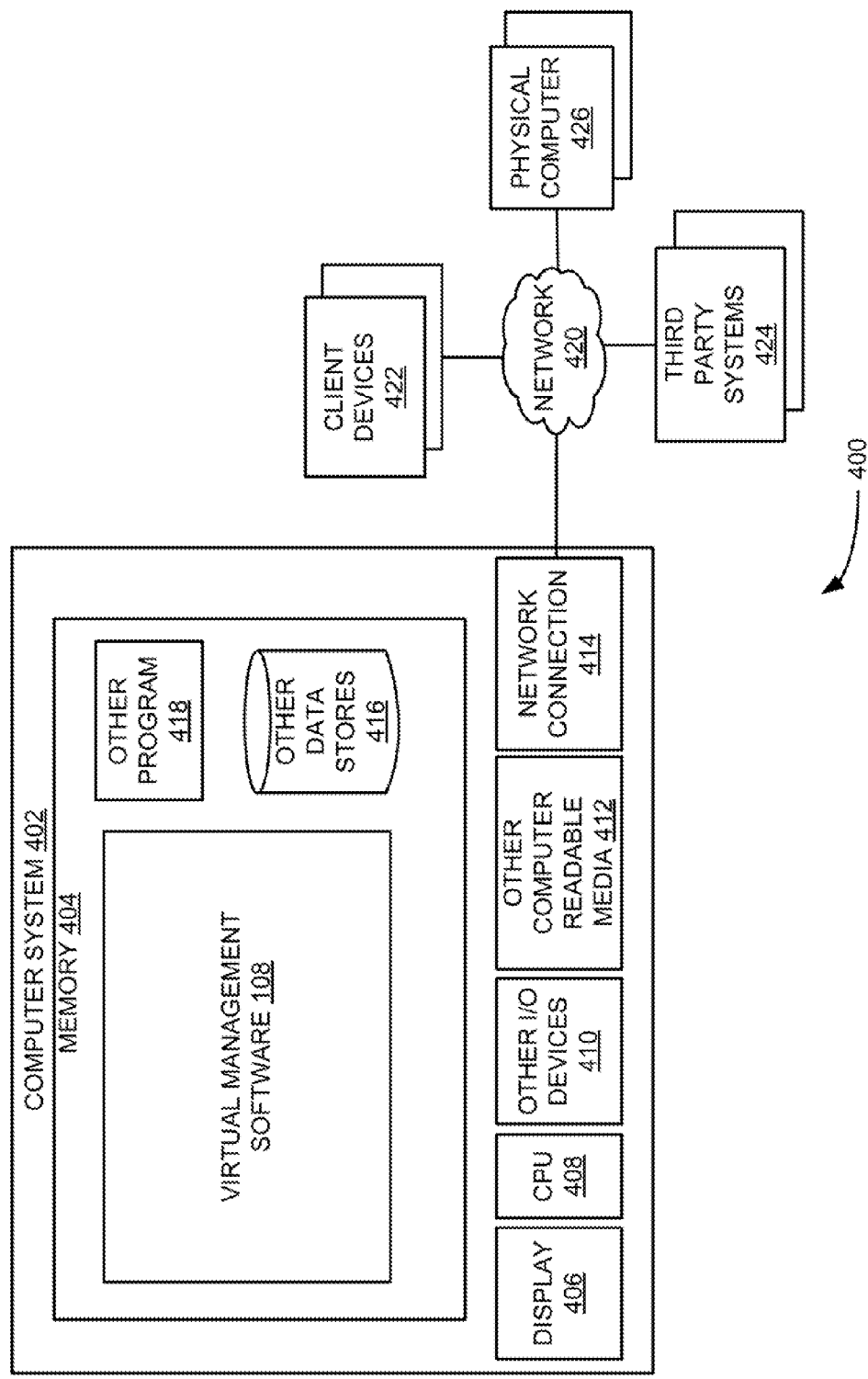
FIG. 4 is a block diagram of an example computing system for dynamically configuring the load balancer, such as the one shown in FIGS. 1 and 2, according to an example embodiment.

FIG. 4 is a block diagram 400 of an example computing system for dynamically configuring a load balancer, such as the one shown in FIGS. 1 and 2, according to an example embodiment. In particular, FIG. 4 shows computing system 402 that may be utilized to implement virtual management software 108, such as shown in FIG. 1.

Note that one or more general purpose virtual or physical computer systems suitably instructed may be used to implement virtual management software 108 including load balancing manager 122 (shown in FIG. 1). In addition, computing system 402 may comprise one or more distinct computing systems/devices and may span distributed locations. Furthermore, each block shown may represent one or more such blocks as appropriate to a specific embodiment or may be combined with other blocks. Also, virtual management software 108 including load balancing manager 122 may be implemented in software, hardware, firmware, or in some combination to achieve the capabilities described herein.

In the embodiment shown, computing system 402 may comprise computer memory ("memory") 404, display 406, one or more Central Processing Units ("CPU") 408, Input/output (I/O) devices 410 (e.g., keyboard, mouse, etc.), other computer-readable media 412, and network connections 414. Virtual management software 108 is shown residing in memory 404. The components of virtual management software 108 may execute on one or more CPUs 408 and implement techniques described herein. Other code or programs 418 (e.g., an administrative interface, a Web server, and the like) and potentially other data repositories, such as data store 416, may also reside in memory 404, and execute on one or more CPUs 408. One or more of the components in FIG. 4 may not be present in any specific implementation. For example, some embodiments may not provide other computer readable media 412 or display 406.

Virtual management software 108 interacts via network 420 with client devices 422, physical computers 426, and/or third-party systems/applications 424. Network 420 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed above with reference to FIGS. 1 and 2, virtual management software 108 including load balancing manager 122 dynamically configures load balancing rules in the virtual network environment. The architecture shown in FIG. 4 may in some embodiments be partially or fully virtualized. For example, computer system 402 may be one or possibly many VMs executing on physical hardware and managed by a hypervisor, virtual machine monitor, or similar technology. Also, physical computers 426 may include virtualization logic to manage multiple VMs.

In an example embodiment, components/modules of virtual management software 108 are implemented using standard programming techniques. For example, virtual management software 108 may be implemented as a "native" executable running on CPU 408, along with one or more static or dynamic libraries. In other embodiments, virtual management software 108 may be implemented as instructions processed by a VM that executes as one of other programs 418.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using, a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module and in different orders, and by different components/modules, yet still achieve the described functions.

Furthermore, in some embodiments, some or all of the components of virtual management software 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of as single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration vicarious modifications may be made without deviating from the spirit and scope of this disclosure. For example, the methods, techniques, and systems for dynamic configuration of a load balancer in a virtual network environment Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for dynamic configuration of a load balancer in a virtual network environment, the method comprising:
configuring load balancing rules using virtual machine (VM) inventory objects, wherein the VM inventory objects are VMs and associated virtual network interface cards (vNICs), and wherein the VM inventory objects are specified in a source and/or a destination of the configured load balancing rules;
transforming the configured load balancing rules by replacing the VM inventory objects that are specified in the source and/or destination of the configured load balancing rules with associated Internet protocol (IP) addresses using one of an IP address management (IPAM) table and a network address translation (NAT) table;
sending the transformed load balancing rules to the load balancer for load balancing network traffic between a plurality of VMs running on at least one host computing system in at least one computing network; and
dynamically updating the transformed load balancing rules sent to the load balancer when changes occur in the VM inventory objects.

2. The method of claim 1, further comprising:
determining whether there are any updates made to at least one of the configured load balancing rules, the IPAM table, the NAT table and the VM inventory objects;
if so, dynamically updating the transformed load balancing rules sent to the load balancer by repeating the steps of configuring, transforming and sending; and
if not, continuing the step of determining whether there are any updates made to the at least one of the configured load balancing rules, the IPAM table, the NAT table and the VM inventory objects.

3. The method of claim 2, further comprising:
dynamically maintaining updates to the at least one of the VM inventory objects, the IPAM table, the NAT table and the configured load balancing rules.

4. The method of claim 2, wherein the updates comprise at least one of addition of a VM, deletion of a VM, change in a network property of a vNIC, addition/deletion of a vNIC to a VM, change of VM's assigned IP address, change of VM's NAT IP address, addition/change of attributes of a VM and change in configured load balancing rules and wherein the change in configured load balancing rules is one of addition of a load balancing rule, deletion of a load balancing rule and update of a load balancing rule in which one of a source VM inventory object and a destination VM inventory object referenced changes.

5. The method of claim 1, wherein transforming the load balancing rules by replacing, the VM inventory objects with the associated IP addresses using the one of the IPAM table and the NAT table, comprises:

replacing any of the VM inventory objects specified in at least one of the source and the destination of the configured load balancing rules with assigned IP addresses of the VM inventory objects using the IPAM table, if the configured load balancing rules specify using NIC assigned IP addresses, and replacing any of remaining VM inventory objects specified in at least one of the source and the destination of the configured load balancing rules with NAT IP addresses of the VM inventory objects using the NAT table, if the configured load balancing rules specify using NAT assigned IP addresses.

6. A system, comprising:
at least one host computing system hosting multiple virtual machines (VMs) in at least one computing network;
a load balancer coupled to the at least one host computing system; and
a virtual management server, comprising:
  a load balancing manager to dynamically configure the load balancer in a virtual network environment, by:
    configuring load balancing rules using VM inventory objects, wherein the VM inventory objects are VMs and associated virtual network interface cards (vNICs), and wherein the VM inventory objects are specified in a source and/or a destination of the configured load balancing rules:
    transforming the configured load balancing rules by replacing the VM inventory objects that are specified in the source and/or destination of the configured load balancing rules with associated Internet protocol (IP) addresses using one of an IP address management (IPAM) table and a network address translation (NAT) table; and
    sending the transformed load balancing rules to the load balancer for load balancing network traffic between the multiple VMs running on the at least one host computing system in the at least one computing network; and
    dynamically updating the transformed load balancing rules sent to the load balancer when changes occur in the VM inventory objects.

7. The system of claim 6, wherein the load balancing manager is further configured to:
determine whether there are any updates made to at least one of the configured load balancing rules, the IPAM table, the NAT table and the VM inventory objects;
if so, dynamically update the transformed load balancing rules sent to the load balancer by repeating the steps of configuring, transforming and sending; and
if not, continue the step of determining whether there are any updates made to the at least one of the configured load balancing rules, the IPAM table, the NAT table and the VM inventory objects.

8. The system of claim 7, wherein the load balancing manager is further configured to:
dynamically maintain updates to the at least one of the VM inventory objects, the IPAM table, the NAT table and the configured load balancing rules.

9. The system of claim 7, wherein the updates comprise at least one of addition of a VM, deletion of a VM, change in a network property of a vNIC, addition/deletion of a vNIC to a VM, change of VM's assigned IP address, change of VM's NAT IP address, addition/change of attributes of a VM and change in configured load balancing rules and wherein the change in configured load balancing rules is one of addition of a load balancing rule, deletion of a load balancing rule and update of a load balancing rule in which one of a source VM inventory object and a destination VM inventory object referenced changes.

10. The system of claim 6, wherein the load balancing manager is configured to:
replace any of the VM inventory objects specified in at least one of the source and the destination of the configured load balancing rules with assigned IP addresses of the VM inventory objects using the IPAM table, if the configured load balancing rules specify using NIC assigned IP addresses; and
replace any of remaining VM inventory objects specified in at least one of the source and the destination of the configured load balancing rules with NAT IP addresses of the VM inventory objects using the NAT table, if the configured load balancing rules specify using NAT assigned IP addresses.

11. A non-transitory computer-readable storage medium including instructions that are configured, when executed by a computing device, to perform a method for dynamic configuration of a load balancer in a virtual network environment, the method comprising:
configuring load balancing rules using virtual machine (VM) inventory objects, wherein the VM inventory objects are VMs and associated virtual network interface cards (vNICs), and wherein the VM inventory objects are specified in a source and/or a destination of the configured load balancing rules;
transforming the configured load balancing rules by replacing the VM inventory objects that are specified in the source and/or destination of the configured load balancing rules with associated Internet protocol (IP) addresses using one of an IP address management (IPAM) table and a network address translation (NAT) table;
sending the transformed load balancing rules to the load balancer for load balancing network traffic between a plurality of VMs running on at least one host computing system in at least one computing network; and
dynamically updating the transformed load balancing rules sent to the load balancer when changes occur in the VM inventory objects.

12. The non-transitory computer-readable storage medium of claim 11, further comprising:
determining whether there are any updates made to at least one of the configured load balancing rules, the IPAM table, the NAT table and the VM inventory objects;
if so, dynamically updating the transformed load balancing rules sent to the load balancer by repeating the steps of configuring, transforming and sending; and
if not, continuing the step of determining whether there are any updates made to the at least one of the configured load balancing rules, the IPAM table, the NAT table and the VM inventory objects.

13. The non-transitory computer-readable storage medium of claim 12, further comprising:
dynamically maintaining updates to the at least one of the VM inventory objects, the IPAM table, the NAT table and the configured load balancing rules.

14. The non-transitory computer-readable storage medium of claim 12, wherein the updates comprise at least one of addition of a VM, deletion of a VM, change in a network property of a vNIC, addition/deletion of a vNIC to a VM, change of VM's assigned IP address, change of VM's NAT IP address, addition/change of attributes of a VM and change in configured load balancing rules and wherein the change in configured load balancing rules is one of addition of a load balancing rule, deletion of a load balancing rule and update of a load balancing rule in which one of a source VM inventory object and a destination VM inventory object referenced changes.

15. The non-transitory computer-readable storage medium of claim 11, wherein transforming the load balancing rules by replacing the VM inventory objects with the associated IP addresses using the one of the IPAM table and the NAT table, comprises:

replacing any of the VM inventory objects specified in at least one of the source and the destination of the configured load balancing rules with assigned IP addresses of the VM inventory objects using the IPAM table, if the configured load balancing rules specify using NIC assigned IP addresses; and replacing any of remaining VM inventory objects specified in at least one of the source and the destination of the configured load balancing rules with NAT IP addresses of the VM inventory objects using the NAT table, if the configured load balancing, rules specify using NAT assigned IP addresses.

\* \* \* \* \*